US009088560B1

(12) United States Patent
Newstadt et al.

(10) Patent No.: US 9,088,560 B1
(45) Date of Patent: Jul. 21, 2015

(54) SYSTEMS AND METHODS FOR VALIDATING LOGIN ATTEMPTS BASED ON USER LOCATION

(71) Applicant: Symantec Corporation, Mountain View, CA (US)

(72) Inventors: Keith Newstadt, West Newton, MA (US); Ilya Sokolov, Boston, MA (US)

(73) Assignee: Symantec Corporation, Mountain View, CA (US)

(*) Notice: Subject to any disclaimer, the term of this patent is extended or adjusted under 35 U.S.C. 154(b) by 2 days.

(21) Appl. No.: 14/197,687

(22) Filed: Mar. 5, 2014

(51) Int. Cl.
*H04L 29/06* (2006.01)

(52) U.S. Cl.
CPC ..................... *H04L 63/08* (2013.01)

(58) Field of Classification Search
None
See application file for complete search history.

(56) References Cited

U.S. PATENT DOCUMENTS

| | | | |
|---|---|---|---|
| 7,360,248 B1* | 4/2008 | Kanevsky et al. | 726/21 |
| 2004/0010472 A1* | 1/2004 | Hilby et al. | 705/67 |
| 2007/0136573 A1* | 6/2007 | Steinberg | 713/155 |
| 2010/0211997 A1* | 8/2010 | McGeehan et al. | 726/4 |
| 2011/0247045 A1* | 10/2011 | Rajagopal et al. | 726/1 |
| 2012/0144468 A1* | 6/2012 | Pratt et al. | 726/7 |
| 2012/0209773 A1* | 8/2012 | Ranganathan | 705/44 |
| 2012/0233683 A1* | 9/2012 | Ibrahim et al. | 726/7 |
| 2012/0304260 A1* | 11/2012 | Steeves et al. | 726/5 |
| 2012/0331536 A1* | 12/2012 | Chabbewal et al. | 726/7 |
| 2013/0340028 A1* | 12/2013 | Rajagopal et al. | 726/1 |

OTHER PUBLICATIONS

Dodson et al., Secure, Consumer-Friendly Web Authentication and Payments with a Phone, LNICST 76, 2012, pp. 17-38.*
Pahlavan et al., Principles of Wireless Networks—A Unified Approach, 2002, Prentice Hall, pp. 534-551.*
"Google now", http://www.google.com/landing/now/#whatisit, as accessed (Jun. 28, 2012).
"Bing Maps", http://www.bing.com/maps/, as accessed Dec. 24, 2014(Jun. 11, 2009).
"Google Now", https://plus.google.com/+google/posts/WhNRboMLynU, as accessed Aug. 18, 2015, (Mar. 29, 2014).
Ilya Sokolov, et al; Systems and Methods for Notifying Contacts About the Status of Persons Impacted by Significant Unforeseen Events; U.S. Appl. No. 14/525,244, filed Oct. 28, 2014.
"Google now", http://www.google.com/landing/now/#whatisit, as accessed (Jun. 28, 2012), Dec. 24, 2014.
"Bing Maps", http://www.bing.com/maps/, as accessed (Jun. 11, 2009), Dec. 24, 2014.

* cited by examiner

*Primary Examiner* — Minh Dinh
(74) *Attorney, Agent, or Firm* — ALG Intellectual Property, LLC

(57) ABSTRACT

A computer-implemented method for validating login attempts based on user location may include (1) detecting a login attempt by a user to log into a user account, where the login attempt originates from an atypical location, (2) determining that the atypical location is inconsistent with a pattern of past login locations for the user, (3) retrieving location information that indicates a current location of the user from at least one third-party Internet resource, (4) determining, based on the location information, that the atypical location of the login attempt matches the current location of the user, and (5) trusting that the login attempt legitimately originates from the user based at least in part on the atypical location matching the current location of the user. Various other methods, systems, and computer-readable media are also disclosed.

20 Claims, 7 Drawing Sheets ated login attempts by users at unusual locations often rely upon increasing the complexity of the login sequence. This added burden to accessing accounts may frustrate users and may sometimes foil legitimate login attempts. Traditional systems may also leave the login process unchanged but may place a warning in the user's account about the unusual login, which is convenient for the user but does nothing to prevent attackers from gaining unauthorized access to the account if the login attempt is indeed malicious. Accordingly, the instant disclosure identifies and addresses a need for additional and improved systems and methods for validating login attempts based on user location.

SYSTEMS AND METHODS FOR VALIDATING LOGIN ATTEMPTS BASED ON USER LOCATION

BACKGROUND

The first computing devices were large machines that were far from portable. Since the introduction of laptops, computing devices have become increasingly portable, and the trend towards decreased size and increased portability is only accelerating with smartphones, tablets, and even smart watches. However, increased portability brings increased security concerns. When computing devices were not portable, attempts by a user to use their device to log into an online account from a new location were rare and could be justifiably deemed suspicious. Now that users bring their devices with them wherever they go, it is common for a user to attempt to log into accounts from faraway places.

Traditional systems for differentiating malicious and legitimate login attempts by users at unusual locations often rely upon increasing the complexity of the login sequence. This added burden to accessing accounts may frustrate users and may sometimes foil legitimate login attempts. Traditional systems may also leave the login process unchanged but may place a warning in the user's account about the unusual login, which is convenient for the user but does nothing to prevent attackers from gaining unauthorized access to the account if the login attempt is indeed malicious. Accordingly, the instant disclosure identifies and addresses a need for additional and improved systems and methods for validating login attempts based on user location.

SUMMARY

As will be described in greater detail below, the instant disclosure generally relates to systems and methods for validating login attempts based on user location by collecting information from third-party websites that indicates the user's current location and trusting the login attempt if the user's current location matches the location of the login attempt.

In one example, a computer-implemented method for validating login attempts based on user location may include (1) detecting a login attempt by a user to log into a user account, where the login attempt originates from an atypical location, (2) determining that the atypical location is inconsistent with a pattern of past login locations for the user, (3) retrieving location information that indicates a current location of the user from at least one third-party Internet resource, (4) determining, based on the location information, that the atypical location of the login attempt matches the current location of the user, and (5) trusting that the login attempt legitimately originates from the user based at least in part on the atypical location matching the current location of the user.

In some embodiments, the method may include determining the user's location at least in part by determining the location of one or more of the user's associates. In one example, the location information that indicates the current location of the user may include information about a current location of at least one associate of the user who is predicted to be near the current location of the user. The associate of the user may include an additional user that is connected to the user on a social networking platform and/or an additional user with whom the user corresponds.

The location information may include of any of a variety of types of information and/or may be derived from any of a variety sources. In some examples, the location information that indicates the current location of the user may include (1) a picture uploaded by the user that includes location metadata, (2) a picture including the user that includes location metadata, (3) a location of a purchase made by the user, (4) a location specified in a calendar event that the user is scheduled to attend, (5) a location of a check-in performed by the user, (6) geolocation data reported by a device owned by the user, (7) an Internet protocol address of the user, (8) a destination of a plane ticket purchased by the user, and/or (9) a location specified by an event ticket purchased by the user. In some embodiments, the third-party Internet resource may include (1) a social networking platform, (2) a calendaring service, and/or (3) a retail website.

In one embodiment, the computer-implemented method may further include identifying a security measure that applies to login attempts from atypical locations and disabling the security measure for the login attempt in response to trusting that the login attempt legitimately originates from the user.

If a location is determined to be trustworthy, this determination may be stored for later use. In one embodiment, the computer-implemented method may further include (1) identifying a trustworthy location database for the user that stores at least one legitimate location from the pattern of repeated login locations for the user, (2) storing the atypical location in the trustworthy location database based on trusting that the login attempt legitimately originates from the user, and (3) trusting a future login attempt at the atypical location based on the atypical location being stored in the trustworthy location database.

Potential third-party sources of location information may also be stored. In some examples, retrieving the location information that indicates the current location of the user from the third-party Internet resource may include (1) identifying a database of pointers to third-party Internet resources that includes user location information, (2) retrieving a pointer to the third-party Internet resource from the database, and (3) following the pointer to the third-party Internet resource.

In some examples, retrieving the location information that indicates the current location of the user from the third-party Internet resource may include authenticating to a shared authentication system that grants access to a plurality of Internet resources and then authenticating to the third-party Internet resource via the shared authentication system.

Determining that the logic location may be characterized as atypical may be done in a number of ways. In some examples, determining that the atypical location is inconsistent with the pattern of past login locations for the user may include determining that the atypical login location may include a location that exceeds a predetermined threshold for closeness to a known legitimate location of the user. Additionally or alternatively, determining that the atypical location is inconsistent with the pattern of past login locations for the user may include determining that the atypical login location may include a location that has not met a predetermined threshold for legitimate logins by the user at the location.

In one embodiment, a system for implementing the above-described method may include (1) a detection module, stored in memory, that detects a login attempt by a user to log into a user account, where the login attempt originates from an atypical location, (2) a determination module, stored in memory, that determines that the atypical location is inconsistent with a pattern of past login locations for the user, (3) a retrieval module, stored in memory, that retrieves location information that indicates a current location of the user from at least one third-party Internet resource, (4) a matching module, stored in memory, that determines, based on the location information, that the atypical location of the login attempt matches the current location of the user, (5) a trust module, stored in memory, that trusts that the login attempt legitimately originates from the user based at least in part on the atypical location matching the current location of the user, and (6) at least one physical processor configured to execute the detection module, the determination module, the retrieval module, the matching module, and the trust module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) detect a login attempt by a user to log into a user account, where the login attempt originates from an atypical location, (2) determine that the atypical location is inconsistent with a pattern of past login locations for the user, (3) retrieve location information that indicates a current location of the user from at least one third-party Internet resource, (4) determine, based on the location information, that the atypical location of the login attempt matches the current location of the user, and (5) trust that the login attempt legitimately originates from the user based at least in part on the atypical location matching the current location of the use.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
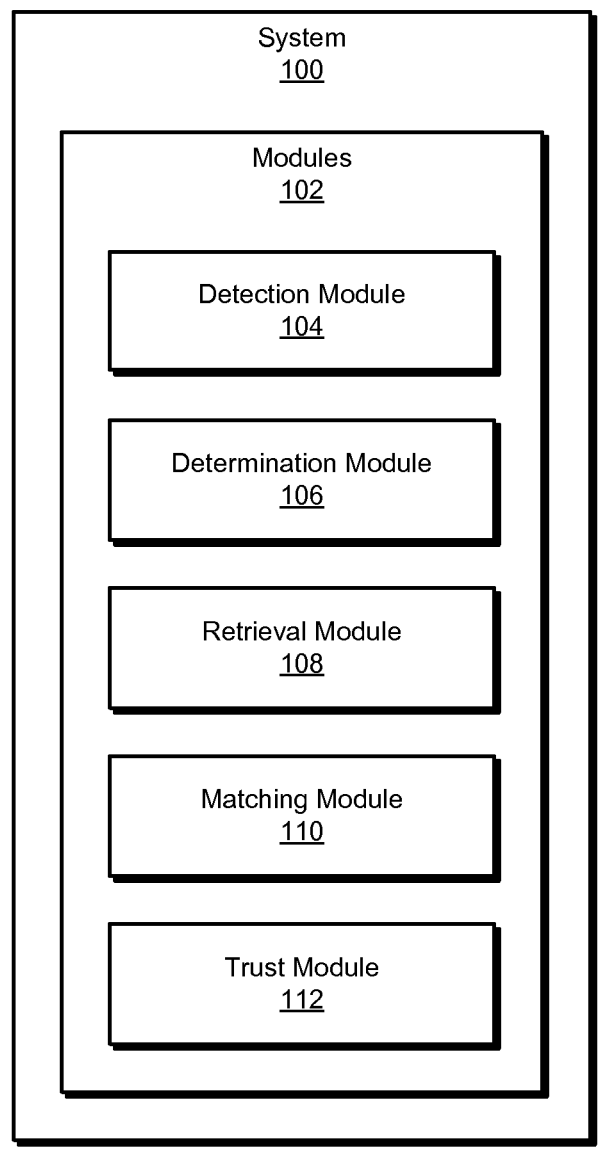
FIG. 1 is a block diagram of an exemplary system for validating login attempts based on user location.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for validating login attempts based on user location. As will be explained in greater detail below, by using location information from third-party Internet resources to determine the user's current location, systems described herein may verify that a login attempt from an atypical location legitimately originates from the user. Verifying the legitimacy of login attempts in this way may reduce the need for additional security measures on login attempts and remove the burden of completing additional login steps from users without sacrificing security in the event of a malicious login attempt from an atypical location.

Figure 2:
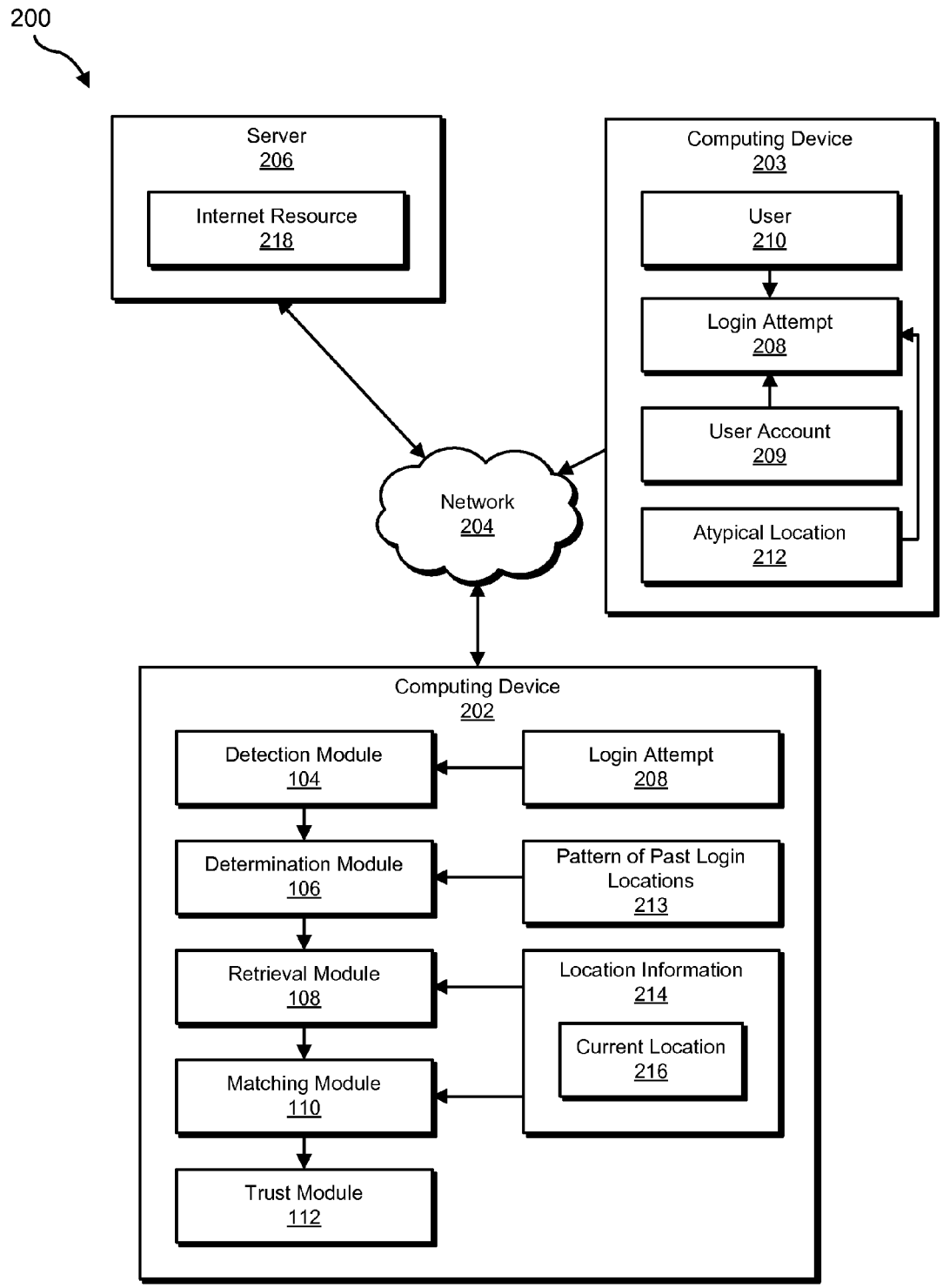
FIG. 2 is a block diagram of an additional exemplary system for validating login attempts based on user location.
Figure 3:
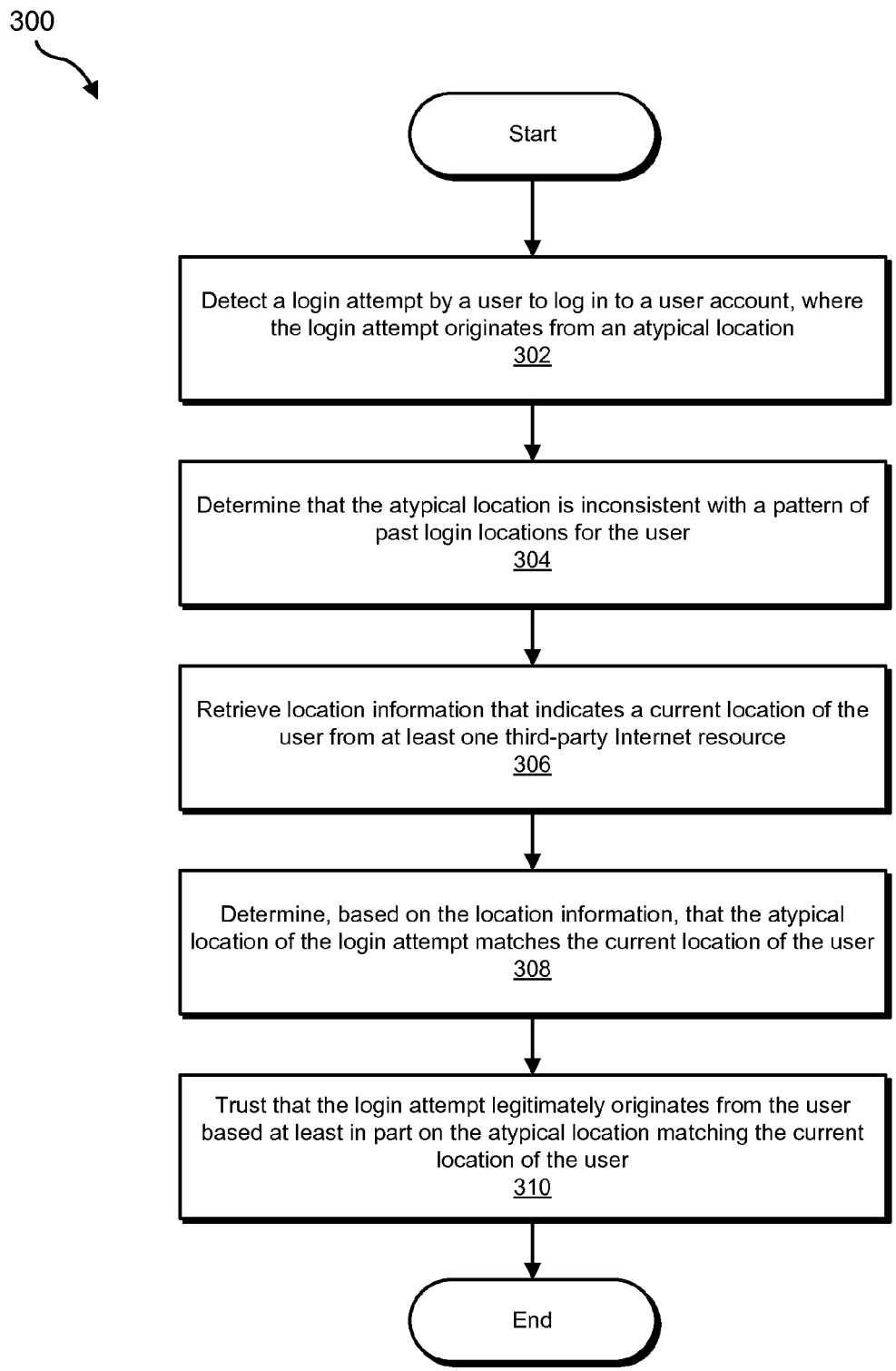
FIG. 3 is a flow diagram of an exemplary method for validating login attempts based on user location.
Figure 4:
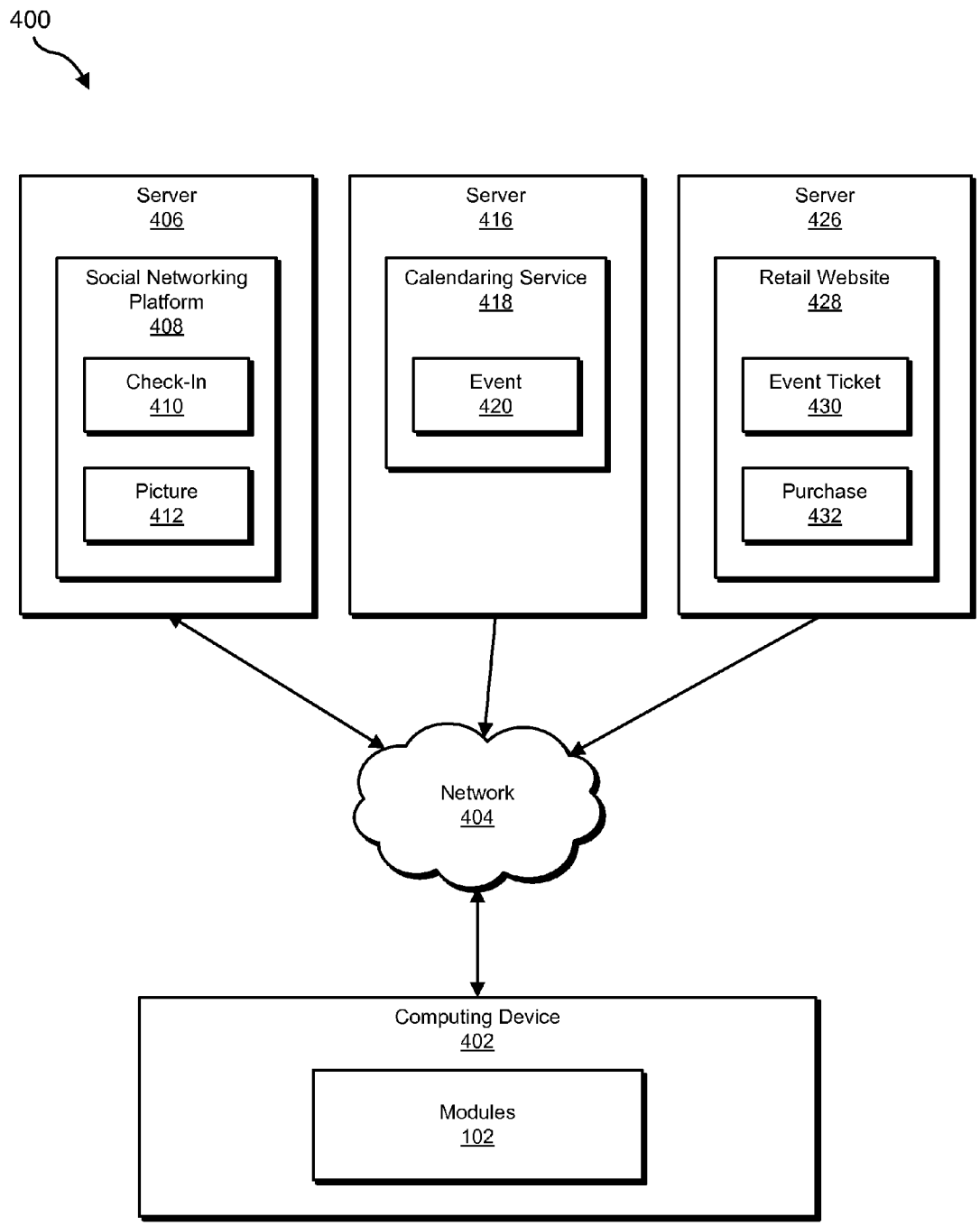
FIG. 4 is a block diagram of an exemplary computing system for validating login attempts based on user location.

The following will provide, with reference to FIGS. 1, 2, and 4, detailed descriptions of exemplary systems for validating login attempts based on user location. Detailed descriptions of corresponding computer-implemented methods will also be provided in connection with FIGS. 3 and 5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for validating login attempts based on user location. As illustrated in this figure, exemplary system 100 may include one or more modules 102 for performing one or more tasks. For example, and as will be explained in greater detail below, exemplary system 100 may include a detection module 104 that may detect a login attempt by a user to log into a user account, where the login attempt originates from an atypical location. Exemplary system 100 may additionally include a determination module 106 that may determine that the atypical location may be inconsistent with a pattern of past login locations for the user. Exemplary system 100 may also include a retrieval module 108 that may retrieve location information that indicates a current location of the user from at least one third-party Internet resource.

Exemplary system 100 may additionally include a matching module 110 that may trust that the login attempt legitimately originates from the user based at least in part on the atypical location matching the current location of the user. Exemplary system 100 may also include a trust module 112 that may trust that the login attempt legitimately originates from the user based at least in part on the atypical location matching the current location of the user. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, computing device 203, and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 and/or a computing device 203 in communication with a server 206 via a network 204. In one example, computing device 202 may be programmed with one or more of modules 102. Additionally or alternatively, computing device 203 may be programmed with one or more of modules 102. Additionally or alternatively, server 206 may be programmed with one or more of modules 102.

In one embodiment, one or more of modules 102 from FIG. 1 may, when executed by at least one processor of computing device 202, computing device 203, and/or server 206, enable computing device 202, computing device 203, and/or server 206 to validate login attempts based on user location. For example, and as will be described in greater detail below, one or more of modules 102 may cause computing device 202, computing device 203, and/or server 206 to validate login attempts based on user location. For example, and as will be described in greater detail below, detection module 104 may detect a login attempt 208 by a user 210 to log into a user account 209, where login attempt 208 originates from an atypical location 212. Once login attempt 208 has been detected, determination module 106 may determine that atypical location 212 is inconsistent with a pattern of past login locations 213 for user 210. Next, retrieval module 108 may retrieve location information 214 that indicates a current location 216 of user 210 from at least one third-party Internet resource 218. After location information 214 has been retrieved, determination module 106 may determine, based on location information 214, that atypical location 212 of login attempt 208 matches current location 216 of user 210. Finally, trust module 112 may trust that login attempt 208 legitimately originates from user 210 based at least in part on atypical location 212 matching current location 216 of user 210.

Computing device 202 and/or computing device 203 generally represent any type or form of computing device capable of reading computer-executable instructions. Examples of computing device 202 and/or computing device 203 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of hosting Internet resources. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202, computing device 203, and/or server 206.

FIG. 3 is a flow diagram of an exemplary computer-implemented method 300 for validating login attempts based on user location. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may detect a login attempt by a user to log into a user account, where the login attempt originates from an atypical location. For example, at step 302 detection module 104 may, as part of computing device 202 in FIG. 2, detect login attempt 208 by user 210 to log into user account 209, where login attempt 208 originates from atypical location 212.

Detection module 104 may detect the login attempt in a variety of ways and contexts. For example, detection module 104 may detect an attempt to log into an online account from a mobile device in an unusual location for the user. In one example, detection module 104 may detect an attempt to log into an online banking service via a smartphone in a location the user has never previously logged in from.

Detection module 104 may be part of a security system on the user's device and/or part of a security system for the user account. Detection module 104 may detect the atypical location in a variety of ways. For example, detection module 104 may use geolocation data of the device initiating the login attempt, the Internet protocol address of the device, and/or the network to which the device is connected to determine that the login attempt originates from an atypical location.

The phrase "user account," as used herein, generally refers to any virtual representation of a user that may require authentication to access. A user account may include a password-protected account in an online system. Examples of user accounts include, without limitation, email accounts, instant messaging accounts, social media accounts, forum accounts, online banking accounts, retail website accounts, and/or streaming service accounts. A user account may also include a profile on a computing device. For example, a user account may include a user profile on a tablet.

The phrase "login attempt," as used herein, generally refers to any attempt to gain access to a user account. A login attempt may include entering a variety of information and/or completing a variety of steps. In one example, a login attempt may be as simple as entering a username. In another example, a login attempt may include entering a username, password and/or a personal identification number as well as answering a security question.

At step 304 one or more of the systems described herein may determine that the atypical location is inconsistent with a pattern of past login locations for the user. For example, at step 304 determination module 106 may, as part of computing device 202 in FIG. 2, determine that atypical location 212 is inconsistent with pattern of past login locations 213 for user 210.

The phrases "pattern of past login locations" or "pattern of repeated login locations," as used herein, generally refer to any pattern that can be found within the locations that have hosted a successful login attempt by the user. A pattern of past login locations may include any number of locations. In one example, a pattern of past locations may include only a single location. In other examples, a pattern of past login locations may only include locations from which the user has logged in multiple times. Additionally or alternatively, a pattern of past login locations may include any location at which a user has ever logged in. A pattern of past login locations may be categorized by frequency of login attempts and/or by region.

For example, the pattern of past login locations may show that most of a user's login attempts take place in the same city. In another example, the pattern of past login locations may show that a user logs in from many different locations within one state. In the latter example, any login attempt from a location within the same state may not be categorized as atypical, while in the former example, a login from a new city within the state may be atypical. In some examples, a pattern of past login locations may be characterized by a type of location (e.g., in addition to and/or instead of a list of specific geographic locations). For example, a user who travels frequently may log in from public wi-fi networks in airports and hotels. An atypical location in this example may include a private wi-fi network and/or a location with no nearby airport or hotel.

Determination module 106 may determine that the login location is inconsistent with the pattern of past login locations in a variety of ways. In some examples, determination module 106 may determine that the atypical location is inconsistent with the pattern of past login locations for the user by determining that the atypical login location may include a location that exceeds a predetermined threshold for closeness to a known legitimate location of the user. The predetermined location for closeness may be the same for every login attempt or it may vary based on the type of user account. For example, a forum account may have less strict security than a banking account and may thus have a larger radius of acceptable login locations than the banking account. The known legitimate location may be the user's home, the user's workplace, and/or any location that has hosted a significant number of successful login attempts. In one example, determination module 106 may determine that a location one hundred miles away from the user's home is an atypical location.

Additionally or alternatively, determination module 106 may determine that the atypical location is inconsistent with the pattern of past login locations for the user by determining that the atypical login location may include a location that has not met a predetermined threshold for legitimate logins by the user at the location. The predetermined threshold for legitimate logins may be the same for every login attempt or it may vary based on the type of account, time since last legitimate login at the location, and/or the distance between the atypical location and a known legitimate location. For example, determination module 106 may determine that a location that is ten miles away from a known legitimate location that has received two legitimate logins in the past may not be atypical, while a location that is two hundred miles away from the nearest known legitimate location and that has also received two legitimate login attempts may be atypical. In one example, determination module 106 may determine that a location is atypical if the user has not successfully logged in from that location in over a year, even if the location may have hosted previous successful login attempts. In another example, determination module 106 may determine that a location is inconsistent with the pattern of past login locations if the location has never been the site of a successful login.

At step 306 one or more of the systems described herein may retrieve location information that indicates a current location of the user from at least one third-party Internet resource. For example, at step 306 retrieval module 108 may, as part of computing device 202 in FIG. 2, retrieve location information 214 that indicates current location 216 of user 210 from at least one third-party Internet resource 218.

The phrase "location information," as used herein, generally refers to any information that may be used to determine a user's location. Location information may be collected passively by an application and/or service, supplied by the user, and/or supplied by another user.

The phrase "third-party Internet resource," as used herein, generally refers to any Internet resource hosted by a party external to the application or service that is retrieving the location information. Third-party internet resources may include websites, application programming interfaces, files, directories, and/or web services. In some embodiments, the third-party Internet resource may include a social networking platform, a calendaring service, and/or a retail website. Examples of a third-party Internet resource may include FACEBOOK, FOURSQUARE, EXPEDIA, STUBHUB, FLICKR, LINKEDIN and/or GLIMPSE.

Retrieval module 108 may retrieve the location information from the third-party Internet resources in a variety of ways and contexts. For example, retrieval module 108 may crawl public websites for location information and/or download location information from applications and/or services to which the user subscribes.

FIG. 4 is a block diagram of an exemplary computing system 400 for validating login attempts based on user location retrieved from third-party Internet resources. As illustrated in FIG. 400, computing device 402 may include modules 102 and/or may be connected to servers 406, 416 and/or 426 via network 404. Server 406 may include a social networking platform 408 that may include check-in 410 and/or picture 412. Check-in 410 and/or picture 412 may include location data for the user, such as image metadata that includes location and/or user-added check-in location information. Server 416 may include a calendaring service 418 that may include event 420. If the user is designated as attending event 420, then the location of event 420 may be considered location data for the user. Server 426 may include a retail website 428 that may include event ticket 430 and/or purchase 432. Event ticket 430 may include an event location that may be location information for the user and/or purchase 432 may include location information such as a shipping address for items included in purchase 432 and/or a physical location of purchase 432.

In some embodiments, the location information that indicates the current location of the user may include (1) a picture uploaded by the user that includes location metadata, (2) a picture including the user that includes location metadata, (3) a location of a purchase made by the user, (4) a location specified in a calendar event that the user is scheduled to attend, (5) a location of a check-in performed by the user, (6) geolocation data reported by a device owned by the user, (7) an Internet protocol address of the user, (8) a destination of a plane ticket purchased by the user, and/or (9) a location specified by an event ticket purchased by the user.

In some examples, the location information may also include temporal data that indicates that the location information is current. For example, pictures may include timestamps that may indicate that the pictures were taken within an acceptable threshold of the current time. Purchases may include data about the time of the purchase, calendar events and/or event tickets may include information about the time and date of the event, and/or plane tickets may include a time and date of the flight. Location information from check-ins, geolocation and/or Internet protocol address reporting may also include a timestamp of when the information was collected.

In some examples, the third-party Internet resources predicted to include location information may be stored in a database. For example, retrieving the location information that indicates the current location of the user from the third-party Internet resource may include (1) identifying a database of pointers to third-party Internet resources that include user location information, (2) retrieving a pointer to the third-party Internet resource from the database, and (3) following the pointer to the third-party Internet resource. In one example, a database may list the Uniform Resource Locator of a social networking platform. The database may be compiled in a variety of ways. In some embodiments, the database may be created by an administrator manually entering pointers to third-party Internet resources. Additionally or alternatively, the database may be created by a script crawling the Internet for resources that may include location information.

In some examples, retrieving the location information that indicates the current location of the user from the third-party Internet resource may include authenticating to a shared authentication system that grants access to a plurality of Internet resources and then authenticating to the third-party Internet resource via the shared authentication system. A shared authentication system may include an independent authentication system and/or may be based around authenticating to a user account for a particular application and/or service. Examples of shared authentication systems may include OAUTH, OPENID, FACEBOOK login, and/or GOOGLE+ login.

In one embodiment, the location information that indicates the current location of the user may include information about a current location of at least one associate of the user who is predicted to be near the current location of the user. The information about the current location of the associate of the user may be collected using any or all of the methods described above. In some examples, the associate of the user may include an additional user that is connected to the user on a social networking platform and/or an additional user with whom the user corresponds via a medium such as email, text messaging, instant messaging and/or social network messaging. Additionally or alternatively, the associate may be included in a user-defined list of trusted associates. In some examples, the associate may be part of a group granted more than default privileges to interact with the user and/or access the user's information. In some examples, the associate may have a specific type of connection to the user such as family, friend, and/or friend-of-friend. Additionally or alternatively, the associate may be required to have been connected to the user via a social networking platform and/or corresponding with the user for a predetermined length of time.

For example, a user from Boston may be in a social networking group with an additional user who is located in Chicago. If the first user initiates a login attempt from Chicago, the login attempt may be trusted based on the first user logging in from the same Internet protocol address as the additional user. In some embodiments, the login attempt may only be trusted if the user is in proximity to multiple associates. For example, a login attempt may only be trusted based on proximity to three or more additional users with whom the user corresponds. Additionally or alternatively, additional users with whom the user corresponds directly may be given more weight when trusting the login attempt. For example, the login attempt may be trusted based on the proximity of a single additional user with whom the user exchanges text messages and/or emails. Additionally or alternatively, the login attempt may be trusted based on the proximity of at least three users with whom the user is in a social networking group.

Returning to FIG. 3, at step 308 one or more of the systems described herein may determine, based on the location information, that the atypical location of the login attempt matches the current location of the user. For example, at step 308 determination module 106 may, as part of computing device 202 in FIG. 2, determine, based on location information 212, that atypical location 212 of login attempt 208 matches current location 216 of user 210.

Determination module 106 may determine that the atypical location matches the current location of the user in a variety of ways. In some examples, determination module 106 may determine that the atypical location is within a predetermined radius of the current location. For example, determination module 106 may determine that the atypical location is within ten miles of the venue for a concert scheduled for today to which the user has purchased tickets, indicating that the user may be near the location of the concert and thus near the atypical location.

In another example, determination module 106 may determine that a name of the atypical location matches a name of the current location. For example, the login attempt may originate from an Internet Protocol address in the city of Brussels, and the user may have purchased plane tickets for a flight yesterday with Brussels as the destination, indicating that the user may currently be in Brussels.

In some examples, determination module 106 may be able to determine that the atypical location exactly matches the current location. For example, determination module 106 may have geolocation data from a device carried by the user that places the device at the atypical location.

In some embodiments, determination module 106 may prevent a login attempt from being classified as suspicious based on the location of the login attempt. For example, a security system may classify a login attempt as suspicious based on the login attempt originating from a previously unused wi-fi network. In this example, determination module 106 may determine the location of the login attempt based on the geolocation of the device initiating the login attempt and may determine that the device has previously logged in to the user account from the geolocation and therefore the login attempt may not be suspicious.

At step 310 one or more of the systems described herein may trust that the login attempt legitimately originates from the user based at least in part on the atypical location matching the current location of the user. For example, at step 310 trust module 112 may, as part of computing device 202 in FIG. 2, trust that login attempt 208 legitimately originates from user 210 based at least in part on atypical location 212 matching current location 216 of user 210.

Trust module 112 may trust the login attempt in a variety of ways. For example, trust module 112 may alter or remove additional security measures for the login attempt based on trusting the login attempt.

In one embodiment, trust module 112 may identify a security measure that applies to login attempts from atypical locations and disable the security measure for the login attempt in response to trusting that the login attempt legitimately originates from the user. For example, trust module 112 may identify a security challenge step that applies to logins from atypical locations and may disable the security challenge step in response to trusting the login attempt. In some examples, trust module 112 may alter disable a security measure by altering a step of the login process. For example, the security measure may add additional challenge questions to a single step of the login process and trust module 112 may remove the additional questions but may not remove the entire step.

In some embodiments, trust module 112 may add an additional security measure to the login process in response to being unable to verify that the login attempt legitimately originates from the user. For examples, systems described herein may determine that the user is logging in from an atypical location and then trust module 112 may determine that the login attempt is suspicious due to being unable to verify that the atypical location is the current location of the user and may then increase security measures on the login attempt.

Figure 5:
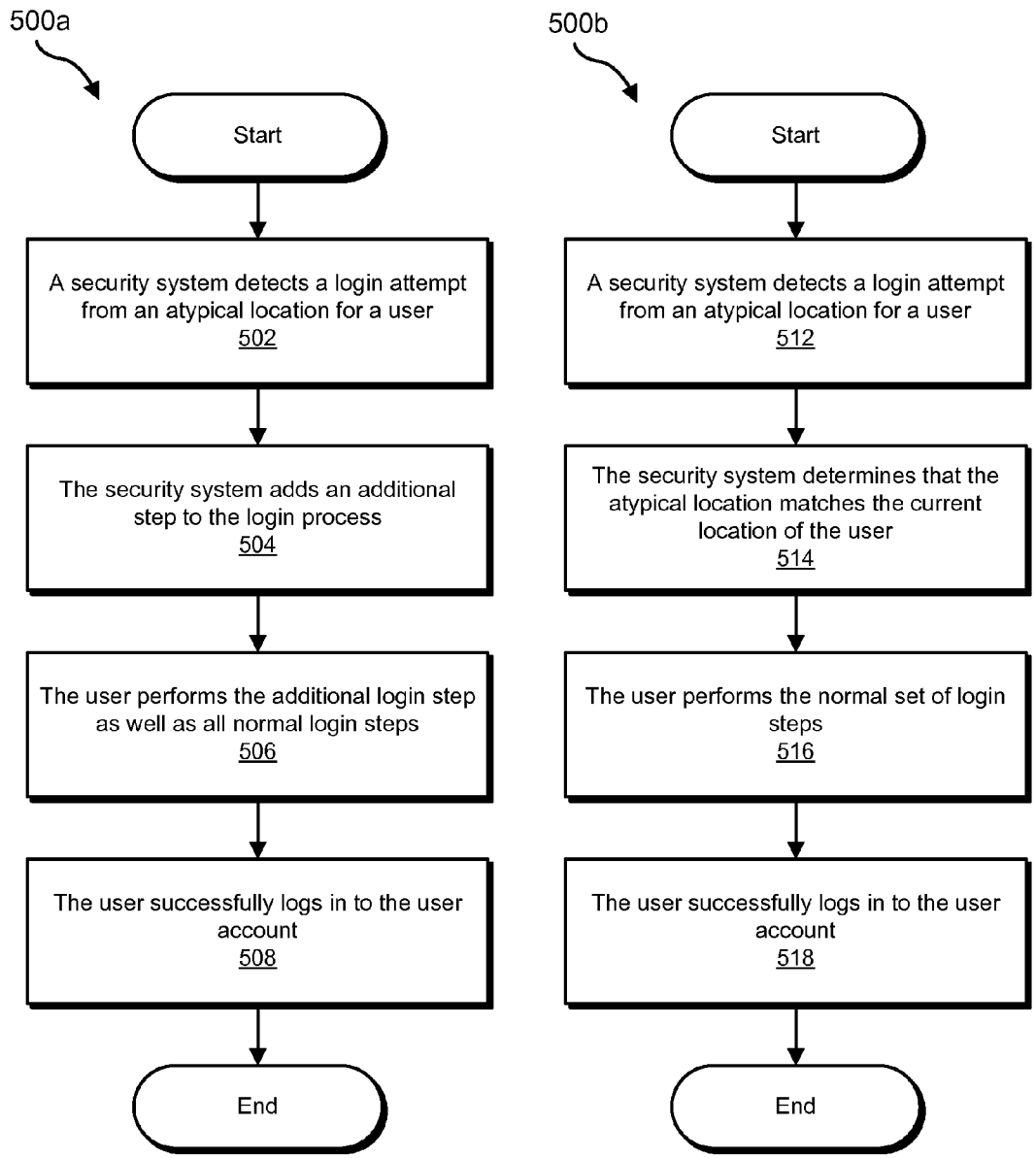
FIG. 5 is a flow diagram of an exemplary method for validating login attempts based on user location.

In some examples, trust module 112 may make the login process more convenient for the user by disabling the additional security option. FIG. 5 is a flow diagram of exemplary method 500a for validating login attempts using traditional methods and exemplary method 500b for validating login attempts based on user location. At step 502 in method 500a, a security system may detect a login attempt from an atypical location for a user. At step 504, the security system may add an additional step to the login process. The additional step may be an additional challenge question and/or requirement for an additional piece of information and/or may involve an out-of-band communication method, such as texting a verification code to a mobile device. In some examples, the additional step may also include restricting the number of allowed incorrect login attempts before the account is locked and/or increasing the timeout between allowed incorrect login attempts. At step 506, the user may perform the additional login step as well as all the normal login steps. If this is successful, at step 508 the user may log into the account.

At step 512 in method 500b, a security system may detect a login attempt from an atypical location for the user. At step 514, the security system may determine that the atypical location matches the current location of the user. At step 516, the user may perform the normal set of login steps without the encumbrance of any additional security requirements. At step 518, the user may successfully log into the user account. Method 500b places the additional work of verifying a login from an unknown location on the security system, rather than on the user as in method 500a, thus creating a more convenient login process for the user.

In some embodiments, trustworthy locations may be stored for later reference. In one example, systems described herein may (1) identify a trustworthy location database for the user that stores at least one legitimate location from the pattern of repeated login locations for the user, (2) store the atypical location in the trustworthy location database based on trusting that the login attempt legitimately originates from the user, and (3) trust a future login attempt at the atypical location based on the atypical location being stored in the trustworthy location database. For example, a user whose pattern of normal logins take place in the Boston area may visit a corporate office in Chicago. The initial login attempt from Chicago may be identified as atypical. However, once the user's current location is verified as being in Chicago, future logins from the office in Chicago may be trusted based on Chicago now being a verified legitimate login location for the user.

As explained above in connection with method 300 in FIG. 3, systems described herein may detect a login attempt by a user from an atypical location. The atypical location may be one the user has never logged in from before or one the user has infrequently logged in from before. In some cases, the atypical location may be outside a certain radius from the user's typical login locations.

After detecting the atypical login location, systems described herein may retrieve data that indicates the location of the user. The data may be retrieved from social media platforms, calendaring services, retail websites, and/or other websites or services. Some or all of this data may be used to determine the current location of the user. If the current location of the user matches the location of the login attempt, systems described herein may trust that the login attempt legitimately originates from the user and is not the product of malicious actors attempting to break in to the user's account.

Once the login attempt has been validated as likely originating from the user, systems described herein may disable additional security measures for the login attempt. For example, a user logging in from an atypical location may normally be required to answer challenge questions and/or input a verification code sent to a mobile device. By placing the burden of verifying the legitimacy of the login attempt on the security system rather than the user, systems described herein may increase convenience and reduce frustration for users logging in from atypical locations.

Figure 6:
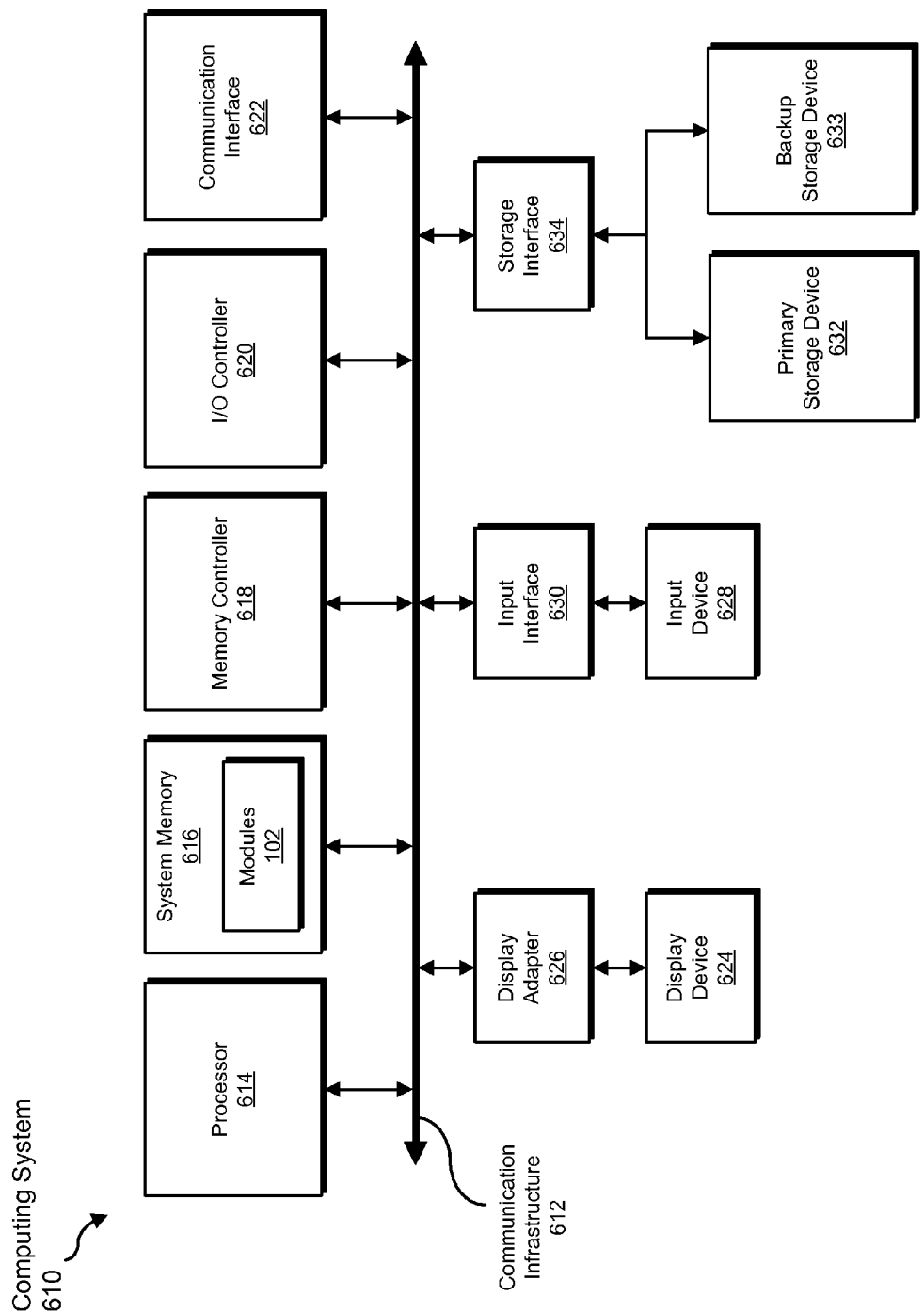
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
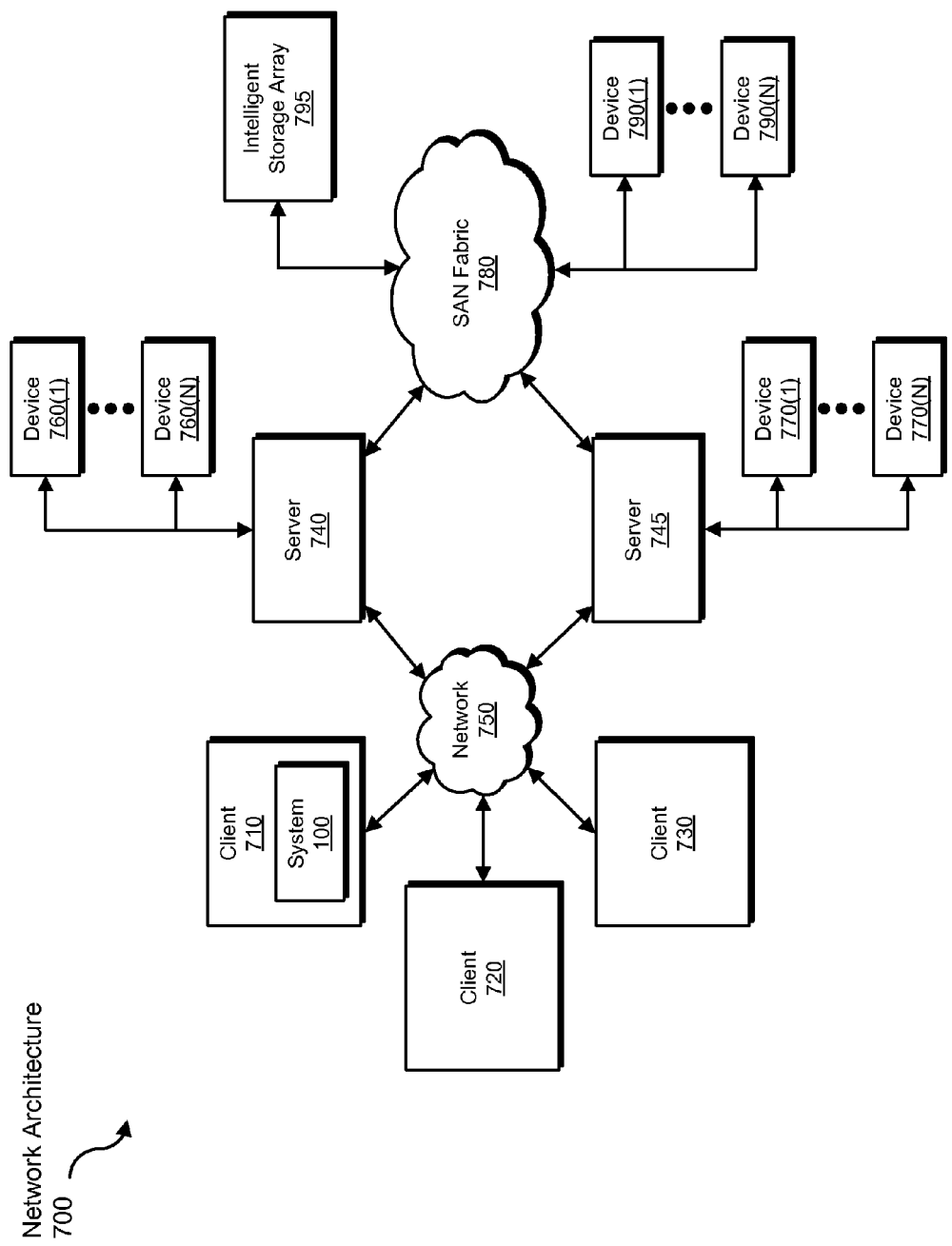
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for validating login attempts based on user location.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smart watches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive third-party location data to be transformed, transform the third-party location data, output a result of the transformation to a comparison function, use the result of the transformation to determine a user's current location, and store the result of the transformation to a database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for validating login attempts based on user location, the method being performed by a computing device comprising at least one processor, the method comprising:

detecting a login attempt by a user to log into a user account, wherein the login attempt originates from an atypical location;

determining that the atypical location is inconsistent with a pattern of past login locations for the user;

retrieving location information that indicates a current location of the user from at least one third-party Internet resource, wherein the location information that indicates the current location of the user comprises information about a current location of at least one associate of the user who is predicted to be near the current location of the user;

determining, based on the location information, that the atypical location of the login attempt matches the current location of the user;

trusting that the login attempt legitimately originates from the user based at least in part on the atypical location matching the current location of the user.

2. The computer-implemented method of claim 1, wherein the associate of the user comprises at least one of:
an additional user that is connected to the user on a social networking platform;
an additional user that the user corresponds with.

3. The computer-implemented method of claim 1, wherein the location information that indicates the current location of the user comprises at least one of:
a picture uploaded by the user that comprises location metadata;
a picture including the user that comprises location metadata;
a location of a purchase made by the user;
a location specified in a calendar event that the user is scheduled to attend;
a location of a check-in performed by the user;
geolocation data reported by a device owned by the user;
an Internet protocol address of the user;
a destination of a plane ticket purchased by the user;
a location specified by an event ticket purchased by the user.

4. The computer-implemented method of claim 1, wherein the third-party Internet resource comprises at least one of:
a social networking platform;
a calendaring service;
a retail website.

5. The computer-implemented method of claim 1, further comprising:
identifying a security measure that applies to login attempts from atypical locations;
disabling the security measure for the login attempt in response to trusting that the login attempt legitimately originates from the user.

6. The computer-implemented method of claim 1, further comprising:
identifying a trustworthy location database for the user that stores at least one legitimate location from the pattern of past login locations for the user;
storing the atypical location in the trustworthy location database based on trusting that the login attempt legitimately originates from the user;
trusting a future login attempt at the atypical location based on the atypical location being stored in the trustworthy location database.

7. The computer-implemented method of claim 1, wherein retrieving the location information that indicates the current location of the user from the third-party Internet resource comprises:
identifying a database of pointers to third-party Internet resources that comprise user location information;
retrieving a pointer to the third-party Internet resource from the database;
following the pointer to the third-party Internet resource.

8. The computer-implemented method of claim 1, wherein retrieving the location information that indicates the current location of the user from the third-party Internet resource comprises:
authenticating to a shared authentication system that grants access to a plurality of Internet resources;
authenticating to the third-party Internet resource via the shared authentication system.

9. The computer-implemented method of claim 1, wherein determining that the atypical location is inconsistent with the pattern of past login locations for the user comprises determining that the atypical login location comprises a location that exceeds a predetermined threshold for closeness to a known legitimate location of the user.

10. The computer-implemented method of claim 1, wherein the determining that the atypical location is inconsistent with the pattern of past login locations for the user comprises determining that the atypical login location comprises a location that has not met a predetermined threshold for legitimate logins by the user at the location.

11. A system for validating login attempts based on user location, the system comprising:
a detection module, stored in memory, that detects a login attempt by a user to log into a user account, wherein the login attempt originates from an atypical location;
a determination module, stored in memory, that determines that the atypical location is inconsistent with a pattern of past login locations for the user;
a retrieval module, stored in memory, that retrieves location information that indicates a current location of the user from at least one third-party Internet resource, wherein the location information that indicates the current location of the user comprises information about a current location of at least one associate of the user who is predicted to be near the current location of the user;
a matching module, stored in memory, that determines, based on the location information, that the atypical location of the login attempt matches the current location of the user;
a trust module, stored in memory, that trusts that the login attempt legitimately originates from the user based at least in part on the atypical location matching the current location of the user;
at least one physical processor configured to execute the detection module, the determination module, the retrieval module, the matching module, and the trust module.

12. The system of claim 11, wherein the associate of the user comprises at least one of:
an additional user that is connected to the user on a social networking platform;
an additional user that the user corresponds with.

13. The system of claim 11, wherein the location information that indicates the current location of the user comprises at least one of:
a picture uploaded by the user that comprises location metadata;
a picture including the user that comprises location metadata;
a location of a purchase made by the user;
a location specified in a calendar event that the user is scheduled to attend;
a location of a check-in performed by the user;
geolocation data reported by a device owned by the user;
an Internet protocol address of the user;
a destination of a plane ticket purchased by the user;
a location specified by an event ticket purchased by the user.

14. The system of claim 11, wherein the third-party Internet resource comprises at least one of:
- a social networking platform;
- a calendaring service;
- a retail website.

15. The system of claim 11:
- further comprising an identification module, stored in memory, that identifies a security measure that applies to login attempts from atypical locations;
- wherein the trust module disables the security measure for the login attempt in response to trusting that the login attempt legitimately originates from the user.

16. The system of claim 11:
- further comprising an identification module, stored in memory, that identifies a trustworthy location database for the user that stores at least one legitimate location from the pattern of past login locations for the user;
- wherein the trust module stores the atypical location in the trustworthy location database based on trusting that the login attempt legitimately originates from the user;
- further comprising a database retrieval module, stored in memory, that trusts a future login attempt at the atypical location based on the atypical location being stored in the trustworthy location database.

17. The system of claim 11, wherein the retrieval module retrieves the location information that indicates the current location of the user from the third-party Internet resource by:
- identifying a database of pointers to third-party Internet resources that comprise user location information;
- retrieving a pointer to the third-party Internet resource from the database;
- following the pointer to the third-party Internet resource.

18. A non-transitory computer-readable medium comprising one or more computer-readable instructions that, when executed by at least one processor of a computing device, cause the computing device to:
- detect a login attempt by a user to log into a user account, wherein the login attempt originates from an atypical location;
- determine that the atypical location is inconsistent with a pattern of past login locations for the user;
- retrieve location information that indicates a current location of the user from at least one third-party Internet resource, wherein the location information that indicates the current location of the user comprises information about a current location of at least one associate of the user who is predicted to be near the current location of the user;
- determine, based on the location information, that the atypical location of the login attempt matches the current location of the user;
- trust that the login attempt legitimately originates from the user based at least in part on the atypical location matching the current location of the user.

19. The non-transitory computer-readable medium of claim 18, wherein the associate of the user comprises at least one of:
- an additional user that is connected to the user on a social networking platform;
- an additional user that the user corresponds with.

20. The non-transitory computer-readable medium of claim 18, wherein the location information that indicates the current location of the user comprises at least one of:
- a picture uploaded by the user that comprises location metadata;
- a picture including the user that comprises location metadata;
- a location of a purchase made by the user;
- a location specified in a calendar event that the user is scheduled to attend;
- a location of a check-in performed by the user;
- geolocation data reported by a device owned by the user;
- an Internet protocol address of the user;
- a destination of a plane ticket purchased by the user;
- a location specified by an event ticket purchased by the user.

* * * * *